(12) United States Patent
Ohashi

(10) Patent No.: US 8,553,244 B2
(45) Date of Patent: Oct. 8, 2013

(54) NOTIFICATION METHOD, MANAGEMENT APPARATUS AND CLIENT APPARATUS

(75) Inventor: Toshio Ohashi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 909 days.

(21) Appl. No.: 12/349,480

(22) Filed: Jan. 6, 2009

(65) Prior Publication Data
US 2009/0195806 A1 Aug. 6, 2009

(30) Foreign Application Priority Data
Feb. 1, 2008 (JP) .................................. 2008-023314

(51) Int. Cl.
G06F 3/12 (2006.01)
G06K 15/00 (2006.01)
G06F 3/00 (2006.01)
G06F 9/445 (2006.01)

(52) U.S. Cl.
USPC ........ 358/1.14; 358/1.13; 358/1.15; 358/406; 358/504; 717/168; 717/171; 717/172; 717/174; 717/169; 717/175; 717/176; 717/177; 710/15; 710/16; 710/17; 710/18; 710/19

(58) Field of Classification Search
CPC ............... G06F 8/60; G06F 8/61; G06F 8/65; H04L 43/0817
USPC ............... 358/1.1, 1.11–1.18; 709/220, 223, 709/224, 203, 217–219; 707/999.001, 999.01; 717/168–178
See application file for complete search history.

(56) References Cited

U.S. PATENT DOCUMENTS

| 5,580,177 | A  | * | 12/1996 | Gase et al. ..................... 400/61 |
| 6,970,923 | B1 | * | 11/2005 | Mukaiyama et al. ......... 709/223 |
| 7,689,673 | B2 |   | 3/2010  | Kemp et al. |
| 2004/0057072 | A1 |   | 3/2004 | Borchers et al. |
| 2005/0044200 | A1 |   | 2/2005 | Aritomi |
| 2005/0165810 | A1 | * | 7/2005 | Yokoyama .................... 707/100 |
| 2006/0277291 | A1 |   | 12/2006 | Misbach |
| 2007/0240156 | A1 | * | 10/2007 | Nakata ......................... 717/178 |
| 2008/0104044 | A1 | * | 5/2008 | Kardamilas et al. ............. 707/4 |

FOREIGN PATENT DOCUMENTS

| CN | 1453696 A | 11/2003 |
| CN | 1649343 A | 8/2005 |
| JP | 2005-31792 A | 2/2005 |
| JP | 2005-209056 | 8/2005 |

OTHER PUBLICATIONS

Korean Office Action dated Dec. 14, 2010 concerning the corresponding Korean Patent Application No. 10-2009-0006822.
European Search Report dated Jan. 19, 2011 concerning the European Patent Application No. 9150533.9.

(Continued)

*Primary Examiner* — Chad Dickerson
(74) *Attorney, Agent, or Firm* — Fitzpatrick, Cella, Harper & Scinto

(57) ABSTRACT

When a change occurs in the status of an image processing apparatus, update information in which the status change is written is generated, and the status change of the image processing apparatus is notified to a client apparatus with a function for delivering the generated update information. A printer driver for the image processing apparatus is distributed from a management apparatus that manages the image processing apparatus to the client apparatus, and the function for delivering the update information is registered with the client apparatus.

3 Claims, 14 Drawing Sheets

(56) References Cited

OTHER PUBLICATIONS

Chinese Office Action regarding Chinese Patent Application No. 2009/10001191.2, filed Sep. 27, 2010.

Korean Office Action dated Mar. 20, 2012 issued in corresponding Korean Patent Application No. 10-2011-0138177.

\* cited by examiner

```
<?xml version="1.0" encoding="utf-8" ?>
```

<RSS version="2.0">
<channel>
<title>NOTIFICATION OF DEVICE STATUS</title>
<link>http://172.24.153.xx/</link>
<description>DEVICE STATUS IS NOTIFIED. </description>
<language>ja</language>

602

<item>
<title>CASSETTE 3 IS OUT OF PAPER [DEVICE NAME: AAAA PRODUCT NAME: AA, UPDATED DATE/TIME: 2006/11/24 23:30:15] </title>
<link>http://172.24.153.xx/xx. html</link>
<description>LOAD A4 SIZE PAPER INTO THIRD CASSETTE FROM TOP </description>
</item>
<item>
<title>CASSETTE 4 IS OUT OF PAPER [DEVICE NAME: AAAA PRODUCT NAME: AA, UPDATED DATE/TIME: 2006/11/24 23:30:15]</title>
<link>http://172.24.153.xx/yy. html</link>
<description>LOAD A4 SIZE PAPER INTO FOURTH CASSETTE FROM TOP </description>
</item>

</channel>
</RSS>

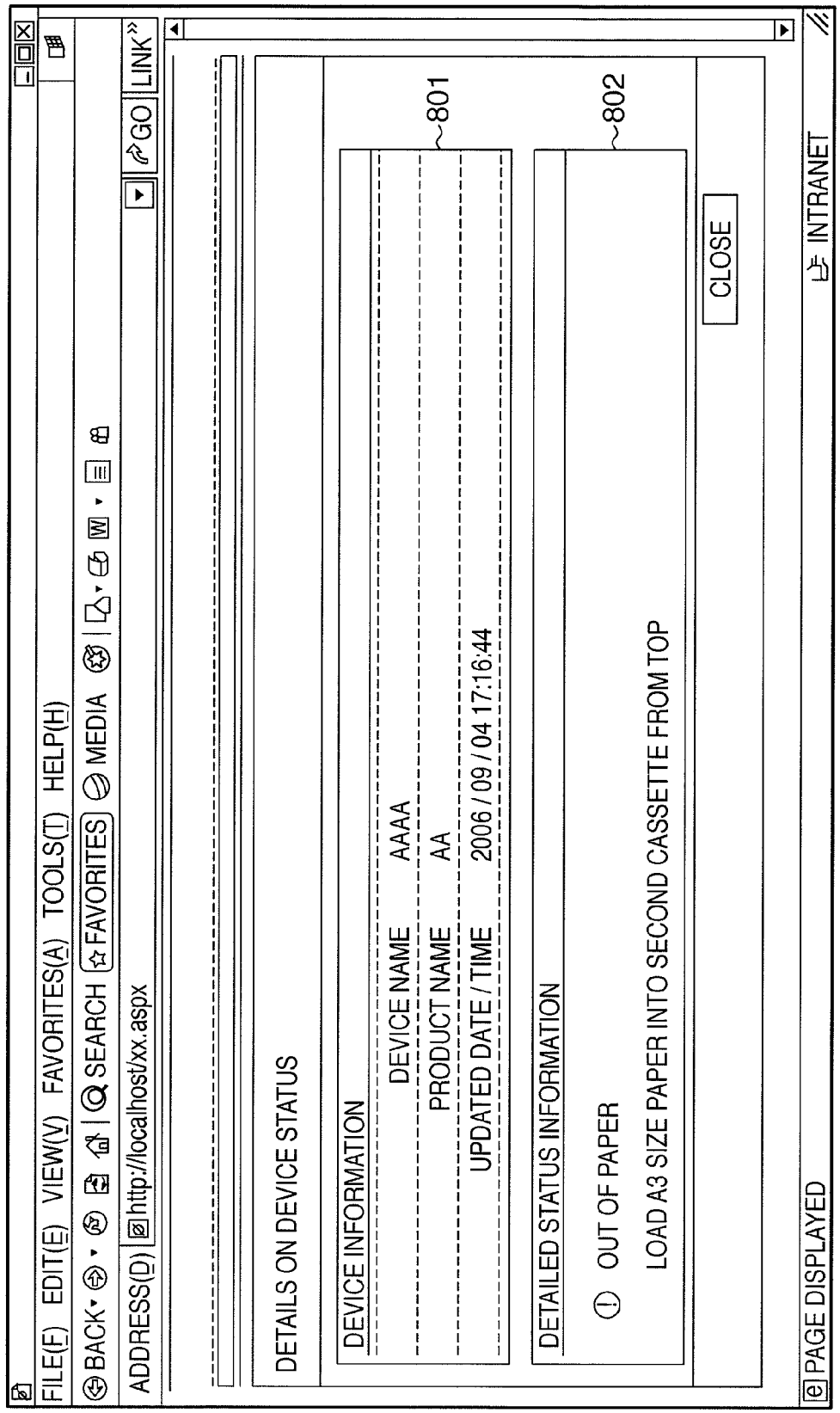

FIG. 9

Step4 □□□
EDIT DEVICE SETTINGS                                    901

DEVICE INFORMATION

- DEVICE NAME
- INSTALLED LOCATION
- ADMINISTRATOR NAME
- ADMINISTRATOR CONTACT INFORMATION
- ADMINISTRATOR'S COMMENT
- NAME OF CUSTOMER SERVICE REPRESENTATIVE
- CUSTOMER SERVICE REPRESENTATIVE CONTACT INFORMATION
- REPRESENTATIVE'S COMMENT

TCP / IP PROTOCOL SETTINGS

- NUMBER OF IP ADDRESS — ☑ TO SET IP ADDRESS, CLICK SETTINGS TO SPECIFY RANGE — SETTINGS »
- SUBNET MASK
- METHOD OF OBTAINING GATEWAY ADDRESS — MANUALLY ▼
- GATEWAY ADDRESS
- PRIMARY DNS SERVER ADDRESS
- SECONDARY DNS SERVER ADDRESS
- DYNAMIC DNS UPDATE — ON ▼
- DNS HOST NAME — LAST 6 LETTERS OF DEVICE'S MAC ADDRESS WILL BE ADDED TO ENTERED DNS HOST NAME
- DNS DOMAIN NAME
- SNTP SERVER 902    903 — [REGISTER] [CANCEL]

FIG. 11

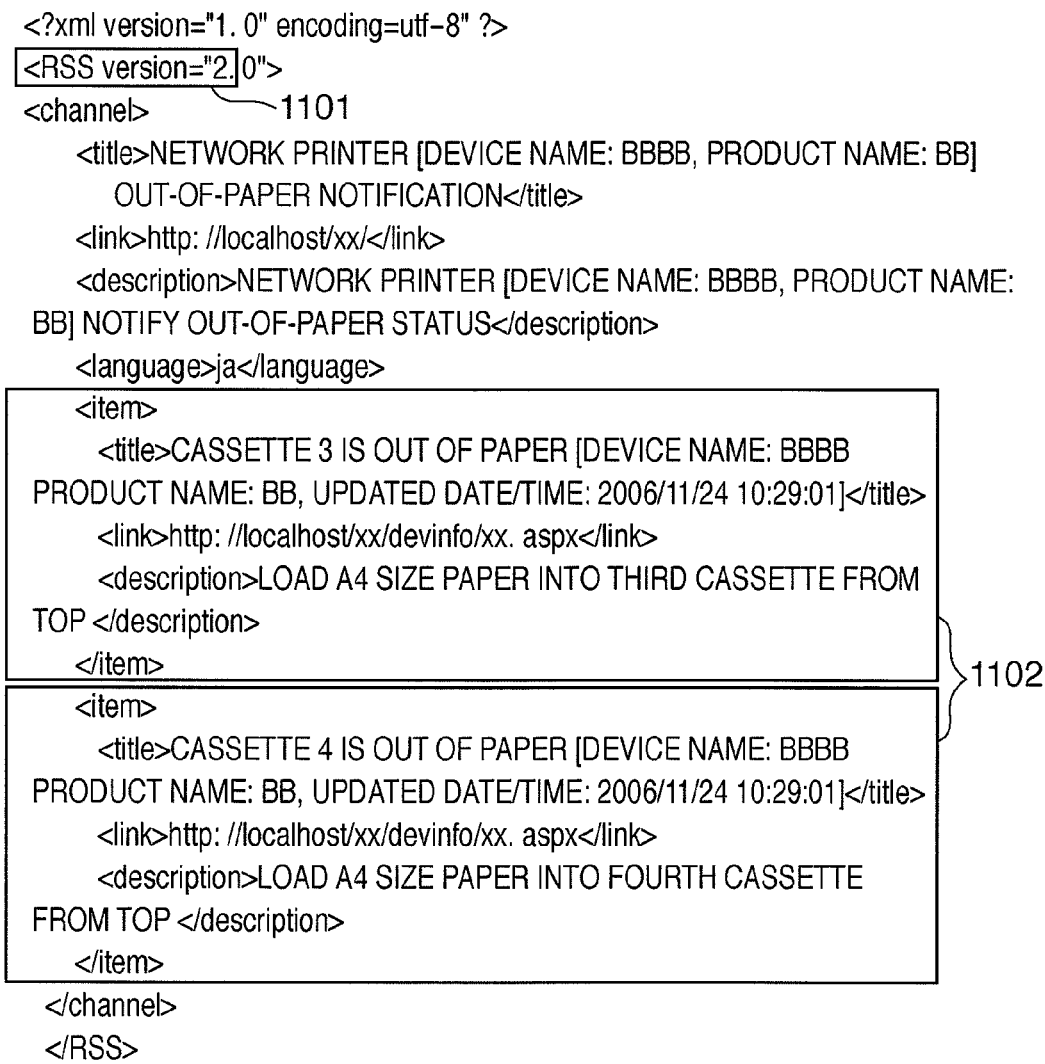

```
<?xml version="1. 0" encoding=utf-8 ?>
<RSS version="2.0">
<channel>                    ~1101
    <title>NETWORK PRINTER [DEVICE NAME: BBBB, PRODUCT NAME: BB]
        OUT-OF-PAPER NOTIFICATION</title>
    <link>http: //localhost/xx/</link>
    <description>NETWORK PRINTER [DEVICE NAME: BBBB, PRODUCT NAME:
BB] NOTIFY OUT-OF-PAPER STATUS</description>
    <language>ja</language>
    <item>
        <title>CASSETTE 3 IS OUT OF PAPER [DEVICE NAME: BBBB
PRODUCT NAME: BB, UPDATED DATE/TIME: 2006/11/24 10:29:01]</title>
        <link>http: //localhost/xx/devinfo/xx. aspx</link>
        <description>LOAD A4 SIZE PAPER INTO THIRD CASSETTE FROM
TOP </description>
    </item>
    <item>
        <title>CASSETTE 4 IS OUT OF PAPER [DEVICE NAME: BBBB
PRODUCT NAME: BB, UPDATED DATE/TIME: 2006/11/24 10:29:01]</title>
        <link>http: //localhost/xx/devinfo/xx. aspx</link>
        <description>LOAD A4 SIZE PAPER INTO FOURTH CASSETTE
FROM TOP </description>
    </item>
</channel>
</RSS>
```

FILE(F) EDIT(E) VIEW(V) FAVORITES(A) TOOLS(T) HELP(H)

BACK ▾ ⊕ ▾ ⊛ ⌂ ⎙ | ⚲ SEARCH ☆ FAVORITES ⓘ MEDIA ⊛ | △▾ ⊕ ⓦ ▾ ≡ ⊞

ADDRESS(D) [ http://localhost/xx.aspx ] ▾ ⇒ GO LINK

Step2
NOTIFICATION CONDITION SETTINGS — 1301

NOTIFICATION CONDITION SETTINGS ALLOWS YOU TO SET CONDITIONS FOR NOTIFYING DEVICE STATUS CHANGE.

NOTIFICATION CONDITIONS

☐ NOTIFY ME WHEN COMMUNICATION WITH DEVICE IS INTERRUPTED
☐ NOTIFY ME WHEN COMMUNICATION WITH DEVICE IS RECOVERED

☑ NOTIFY ME WHEN ERROR OCCURS
☐ NOTIFY ME WHEN ERROR IS RECOVERED

| TYPE OF ERROR | ☑ OUT OF PAPER | ☐ UNMATCHED PAPER SIZE | ☑ PAPER JAM |
| | ☐ TONER / INK ERROR | ☐ PAPER FEED TRAY ERROR | ☐ CASSETTE ERROR |
| | ☐ DRUM CARTRIDGE ERROR | ☐ COVER LEFT OPEN | ☐ PAPER DISCHARGE UNIT ERROR |
| | ☐ MISFEED | ☐ FAX ERROR | ☐ OTHER ERRORS |

1302 — [ REGISTER ] [ CANCEL ] [?]

INTRANET

NOTIFICATION METHOD, MANAGEMENT APPARATUS AND CLIENT APPARATUS

BACKGROUND OF THE INVENTION

1. Field of the Invention

The present invention relates to a technique for notification of changes in the status of an image processing apparatus to a client apparatus via a network.

2. Description of the Related Art

General users who use network printers for the purpose of printing have a desire to learn the status of the printers that they are using. A predominant method by which users can learn printer status is to obtain the printer status using a printer driver or utility software. On the other hand, much of the major network printer management software has a function for notifying the user of the printer status by email.

Also, attention has been paid to Really Simple Syndication (RSS) technology as a new printer status notification method that replaces email. RSS is a general term that encompasses several document formats for delivering headlines, summaries and links provided on website articles. On the website side, RSS data is generated based on headlines, summaries, links, etc. provided on web page articles. As used herein, RSS data is a source written in an XML-based RSS format. There are several versions of RSS format, including RSS 0.91, RSS 2.0, RSS 1.0, Atom, etc.

The client side can receive website update information using an application called an "RSS reader". The RSS reader periodically downloads registered RSS data to obtain the update information, and displays the update information on the screen. If a link is provided on the web page, the user can jump to the web page containing the article.

With this RSS technology, users feel as if information is delivered from websites. This brings about a benefit to the users in that they can efficiently browse only web pages in which they are interested from among a huge number of HTML pages.

Printers with a function for providing the status of a plurality of printers to users in the form of RSS format data using the above-described RSS technology are being proposed these days (see, for example, Japanese Patent Laid-Open No. 2005-209056). According to this proposal, a printer generates an HTML page indicating the printer status, and then generates RSS data containing the headline, summary and links on the generated page. A user who receives the notification registers the URL of the RSS data with the RSS reader installed on a client PC.

With this configuration, the user can readily learn the content of a status change of the printer by using a web browser program. In addition, because the content to be notified is written in an RSS format that is an XML-based generic format, there is an advantage that the restrictions on notification content do not depend on implementations except when RSS data is generated.

However, the conventional method described above has the following problems. In the case of obtaining the printer status using a printer driver or utility software, obtainable printer status information depends on the installed printer driver or utility software.

In addition, in the case of email notification by a printer management apparatus, an email program needs to be installed in the environment of client computers to which notifications are provided. Furthermore, in a situation in which one user uses multiple PCs, a PC that has received an email does not necessarily have an environment in which the printer is set up.

Moreover, in the case of the printer status notification using RSS data generated by the printer, the user needs to manually register RSS feeds with the RSS reader for each printer used by the user. If the number of printers used is large, this complicated procedure will place a burden on the user.

SUMMARY OF THE INVENTION

The present invention enables realization of a technique for notifying a client apparatus of a status change of an image processing apparatus used by a user by using update information without the user having to do a complicated procedure.

According to one aspect of the present invention, there is provided a notification method of a change in the status of an image processing apparatus to a client apparatus via a network, the method comprising: when a change occurs in the status of the image processing apparatus, generating update information in which the status change is written; notifying the client apparatus of the status change of the image processing apparatus with a function for delivering the update information generated in the generating step; and distributing a printer driver for the image processing apparatus from a management apparatus that manages the image processing apparatus to the client apparatus and registering the function for delivering the update information with the client apparatus.

According to another aspect of the present invention, there is provided a management apparatus that manages an image processing apparatus via a network and notifies a client apparatus of a status change of the image processing apparatus, the apparatus comprising: a generating unit configured to, when a change occurs in the status of the image processing apparatus, generate update information in which the status change is written; a notification unit configured to notify the client apparatus of the status change of the image processing apparatus with a function for delivering the update information generated by the generating unit; and a unit configured to distribute a printer driver for the image processing apparatus to the client apparatus and register the function for delivering the update information with the client apparatus.

According to still another aspect of the present invention, there is provided a client apparatus that utilizes an image processing apparatus via a network, the apparatus comprising: a registration unit configured to register a function for delivering update information in which a status change of the image processing apparatus is written when a printer driver for the image processing apparatus is distributed; and an acquisition unit configured to acquire the status change of the image processing apparatus by the function for delivering the update information.

Further features of the present invention will become apparent from the following description of exemplary embodiments with reference to the attached drawings.

BRIEF DESCRIPTION OF THE DRAWINGS

FIG. 6 is a diagram illustrating an example of a screen in which management log update information 315 of the image processing apparatus 130 is displayed.

FIG. 8 is a diagram illustrating an example of a screen in which detailed information of the image processing apparatus 130 managed by the management apparatus 110 is shown.

FIG. 9 is a diagram illustrating an example of a screen in which setting items for the image processing apparatus 130 managed by the management apparatus 110 are shown.

FIG. 11 is a diagram illustrating an example of RSS data of management log update information 304 generated by the management apparatus 110.

FIG. 13 is a diagram illustrating an example of a screen for selecting target events to be notified according to an embodiment of the present invention.

DESCRIPTION OF THE EMBODIMENTS

Hereinafter, a best mode for carrying out the invention will be described in detail with reference to the accompanying drawings.

<System Configuration (Hardware)>

Figure 1:
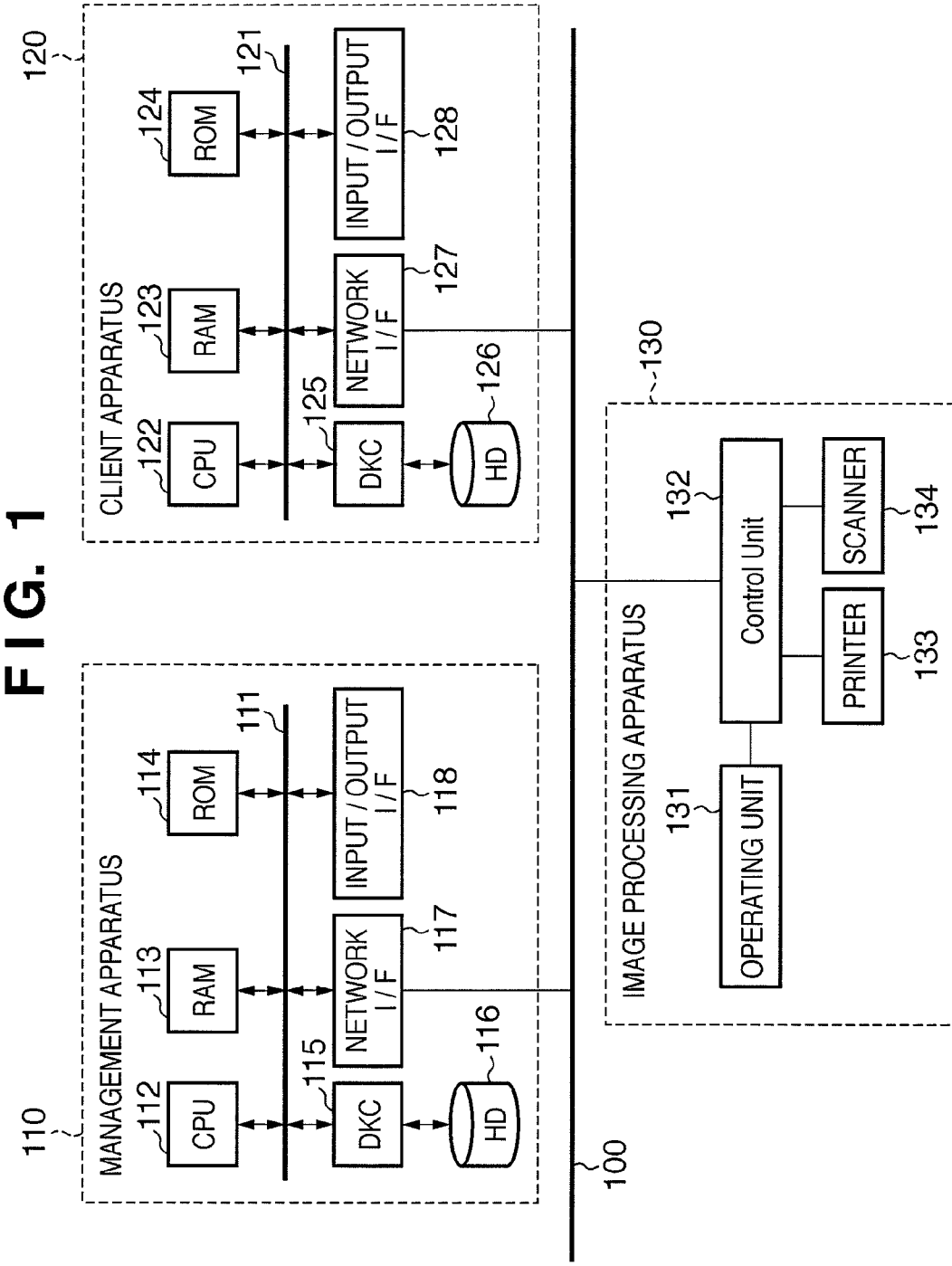
FIG. 1 is a block diagram illustrating an overall configuration of a management system according to an embodiment of the present invention.

FIG. 1 is a block diagram illustrating an overall configuration of a management system according to an embodiment of the present invention. As shown in FIG. 1, the management system includes a management apparatus 110, a client apparatus 120, and an image processing apparatus (apparatus that is to be managed) 130 that are connected to one another via a network 100. The image processing apparatus 130 can be, for example, a multifunction peripheral with a plurality of functions such as a copy function, a print function and a box function, or can be a network-enabled printer.

The network 100 can be a network that is capable of constructing a TCP/IP network and utilizing protocols for monitoring/controlling communication devices via the network. Here, it is assumed that the network 100 can utilize SNMP and its own protocol for monitoring communication devices. SNMP is an abbreviation of "Simple Network Management Protocol".

The management apparatus 110 and the client apparatus 120 both have a generic computer configuration. Here, the management apparatus 110 will be taken as an example and described below, and thus a description of the hardware configuration of the client apparatus 120 is omitted. Reference numerals 111 to 118 included in the management apparatus 110 correspond to reference numerals 121 to 128 included in the client apparatus 120.

In the management apparatus 110, reference numeral 111 denotes a system bus, and takes on a role of connecting the constituent elements of the generic computer. Reference numeral 112 denotes a CPU (central processing unit), which controls the entire computer and performs computational processing. Reference numeral 113 denotes a RAM (random access memory), which is an area in which programs and data for various processes are loaded and executed. Reference numeral 114 denotes a ROM (read-only memory), which is a storage area in which a system startup program and so on are stored.

Reference numeral 115 denotes a DKC (external storage device control unit), which controls external storage devices such as an HD (hard disk) 116. The HD 116 stores programs, data, etc., and these programs, data, etc. are referred to or loaded to the RAM 113 as necessary when the CPU 112 executes processing.

This system is operated while the CPU 112 is executing a basic I/O program and an OS. The basic I/O program is written on the ROM 114, and the OS is written on the HD 116. Upon turning on the computer unit, the OS is loaded from the HD 116 into the RAM 113 by the initial program loading function of the basic I/O program, and the OS starts operating.

Reference numeral 117 denotes a network interface (I/F) connected to the network 100 to perform network communication. Reference numeral 118 denotes an input/output interface (I/F) connected to a keyboard, a display, etc. (not shown) to perform input/output of data.

The image processing apparatus 130 includes an operating unit 131 that provides a user interface, a control unit 132, a printer 133 serving as an image output device, and a scanner 134 serving as an image input device.

The operating unit 131, the printer 133 and the scanner 134 are connected to the control unit 132, and are controlled by the control unit 132. The control unit 132 is connected to the network 100, and communicates with the management apparatus 110 or the client apparatus 120. Here, the image processing apparatus 130 may not include the scanner 134.

<Hardware Configuration of Image Processing Apparatus>

Figure 2:
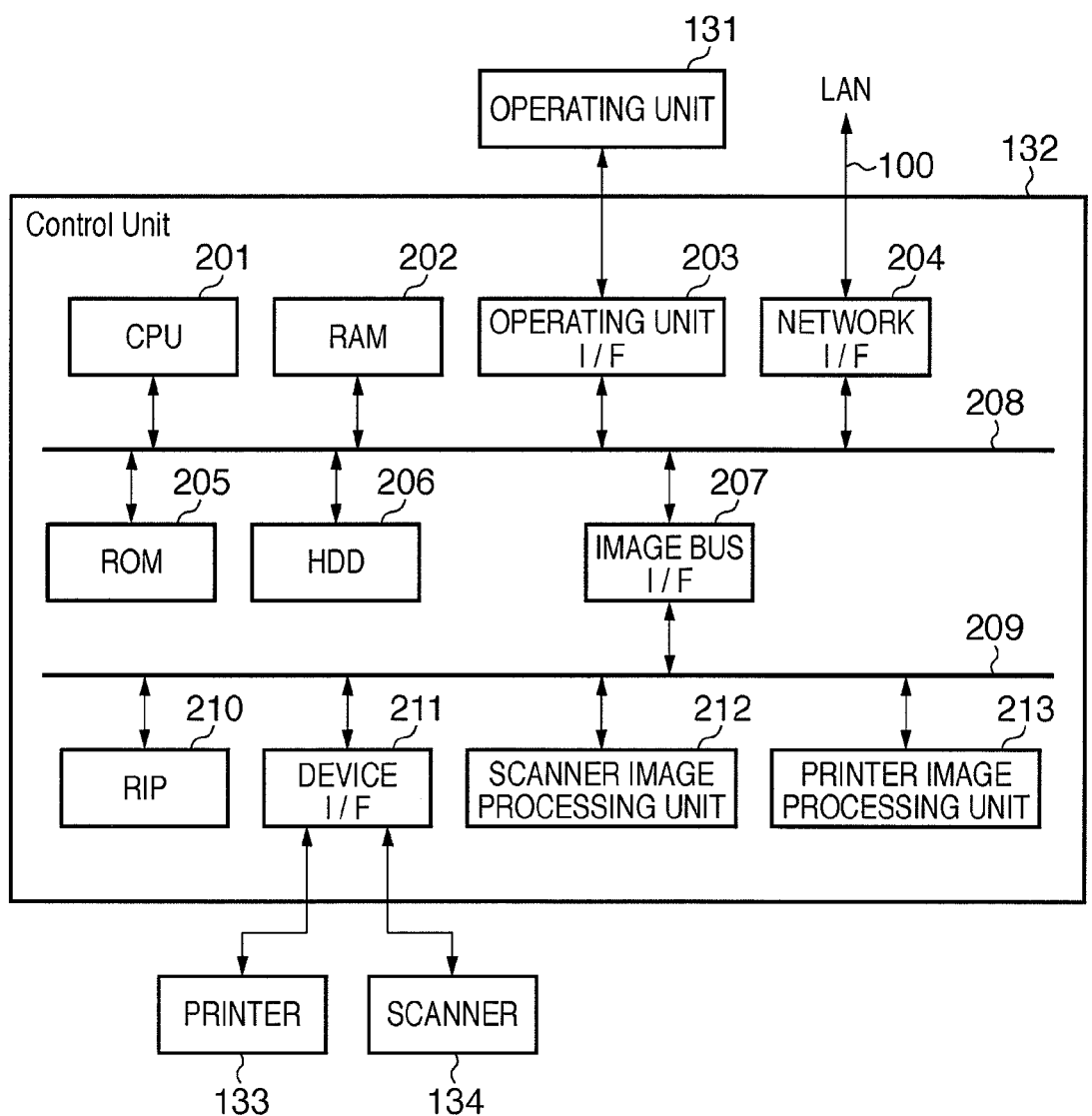
FIG. 2 is a diagram illustrating an example of a hardware configuration of a control unit 132 of an image processing apparatus 130.

FIG. 2 is a diagram illustrating an example of a hardware configuration of the control unit 132 of the image processing apparatus 130. A CPU 201 is a controller that controls the entire control unit 132. A RAM 202 is a system work memory used when the CPU 201 executes processing. The RAM 202 also serves as an image memory that temporarily stores image data. A ROM 205 is a boot ROM, in which the boot program of the system is stored.

An HDD 206 is a hard disk drive, which stores system software and image data. An operating unit I/F 203 is an interface with the operating unit 131, and outputs, to the operating unit 131, image data that should be displayed on the operating unit 131, and also takes on a role of transmitting the information inputted by the user via the operating unit 131 to the CPU 201.

A network I/F 204 controls the connection with the network 100, and performs input/output of information via the network 100. An image bus I/F 207 is a bus bridge for converting data structures that connects a system bus 208 and an image bus 209 that transfers image data at a high speed.

The image bus 209 can be configured with a PCI bus or IEEE 1394. The image bus 209 is connected to a luster image processor (RIP) 210, a device I/F 211, a scanner image processing unit 212 and a printer image processing unit 213.

The RIP 210 expands the PDL commands transmitted from the client apparatus 120 via the network 100 into bit map images. The device I/F 211 connects the printer 133 and the scanner 134 serving as image input/output devices to the control unit 132, and synchronously or asynchronously converts image data.

The scanner image processing unit 212 corrects, processes and edits input image data. The printer image processing unit 213 performs correction, resolution conversion, etc. on print output image data according to the performance of the printer 133. In the configuration of the image processing apparatus 130, the scanner 134 and the scanner image processing unit 212 may be omitted.

<System Configuration (Software)>

Figure 3:
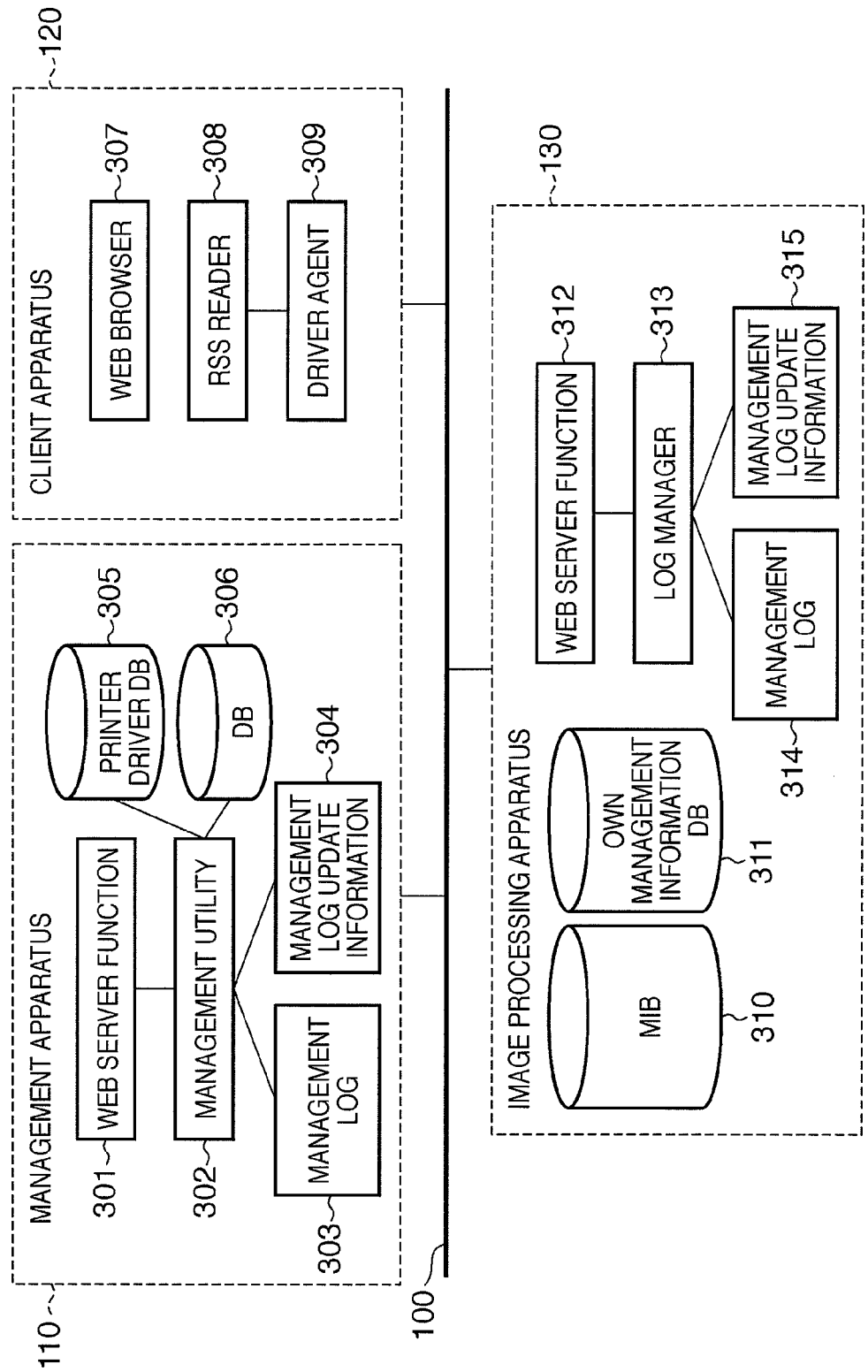
FIG. 3 is a diagram illustrating an example of a software configuration of the management system according to an embodiment of the present invention.

Next, a software configuration of the management system according to the present embodiment will be described with reference to FIG. 3. FIG. 3 is a diagram illustrating an example of a software configuration of the management system of the present embodiment. The management apparatus 110 has a web server function 301. Upon receiving an HTTP GET request from a web browser 307 running on the client apparatus 120, the management apparatus 110 returns web page data stored on the HD 116. Upon receiving the web page data, the web browser 307 formats the web page data and displays it for the user. Through this, the user can access the management apparatus 110 through the web browser 307 running on the client apparatus 120, obtain the information of managed apparatuses (a plurality of image processing apparatuses including the image processing apparatus 130), and make settings.

Figure 4:
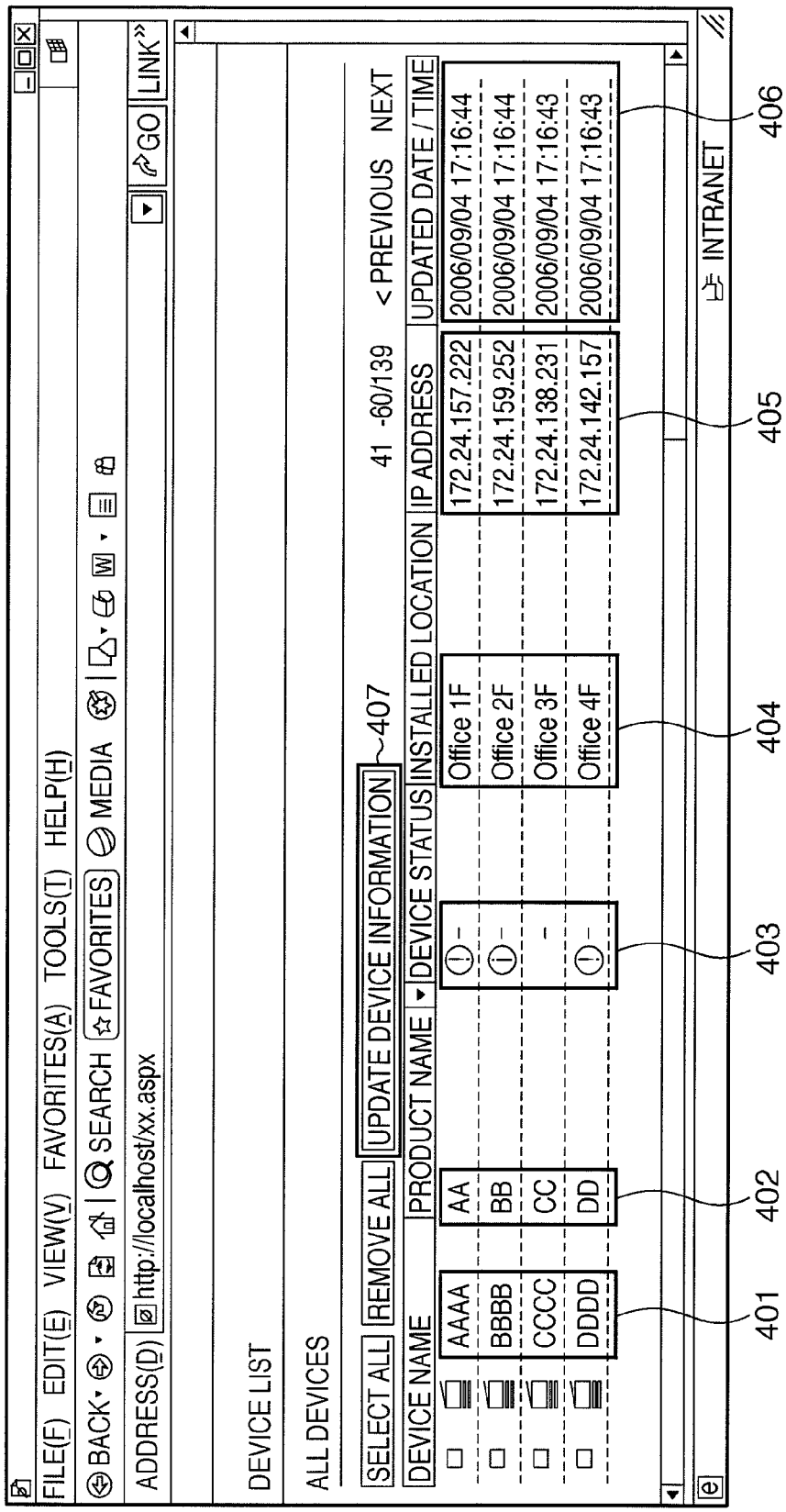
FIG. 4 is a diagram illustrating an example of a screen in which a list of a plurality of image processing apparatuses is displayed.

FIG. 4 is a diagram illustrating an example of a screen in which a list of a plurality of image processing apparatuses is displayed. In this example, connection to the management apparatus 110 is established by using the web browser 307 running on the client apparatus 120, and a list of a plurality of image processing apparatuses that are managed by the management apparatus 110 is displayed. Specifically, device name 401, product name 402, device status 403, installed location 404, IP address 405, and updated date and time 406 are displayed for each image processing apparatus. The device status 403 is displayed with icons that indicate the status of each image processing apparatus and also serve as a link to a page for detailed status of each image processing apparatus.

Upon depressing a device information update button 407, information of a selected image processing apparatus is fetched again from the management apparatus 110, and then displayed. Information of an image processing apparatus is displayed by the management apparatus 110 fetching information from the image processing apparatus in response to a request from the web browser 307 and generating HTML data. However, a configuration is also possible in which the management apparatus 110 periodically fetches information and stores the information in the form of HTML data in advance.

In addition to the web server function 301, a management utility 302, that is, a software module, is installed on the management apparatus 110. The management apparatus 110 functions by executing these functions. The management utility 302 is implemented as a CGI program that executes scripts written in web pages provided by the web server function 301. In this manner, the management utility 302, together with the web server function 301, achieves a web application that manages the image processing apparatuses.

The management apparatus 110 includes two databases, namely, a printer driver DB 305 and a DB 306. In FIG. 3, the printer driver DB 305 and the DB 306 are included in the management apparatus 110, but they may be included in another server computer connected to the network 100.

The management utility 302 monitors, at predetermined intervals, the status of a plurality of image processing apparatuses connected to the network 100 including the image processing apparatus 130, and if there is a change in the status, writes to a management log 303 in HTML format. The management log 303 can be viewed from the web browser 307 executed by the client apparatus 120 via the network 100, due to the web server function 301. When updating the management log 303, the management utility 302 records the summary and link information of update information for management log 303 on management log update information 304 in an RSS format. The management log update information 304 can be viewed from an RSS reader 308 executed by the client apparatus 120 via the network 100, due to the web server function 301.

The management utility 302 delivers a printer driver stored on the printer driver DB 305 to the client apparatus 120 via the network 100. When the management utility 302 installs and sets a printer driver on the client apparatus 120, a driver agent 309 is used. Here, it is assumed that the driver agent 309 is installed on the client apparatus 120 by the management apparatus 110 before the driver is delivered. However, a configuration is also possible in which the driver agent 309 is already installed on the client apparatus 120 in advance.

The client apparatus 120 is a computer that is being constantly used by a user who uses the image processing apparatus 130. As application programs that can be used by the user, the web browser 307 and the RSS reader 308 are already installed. By executing the web browser 307 on the client apparatus 120, the user can browse and operate the web applications provided by the management apparatus 110 and the image processing apparatus 130.

By executing the RSS reader 308 on the client apparatus 120, the user can browse and operate the RSS data provided by the management apparatus 110 and the image processing apparatus 130. When the management apparatus 110 delivers a printer driver, the driver agent 309 is installed on the client apparatus 120.

The driver agent 309 is installed from the management apparatus 110 to the client apparatus 120 via the network 100 by a user who is responsible for administering the client apparatus 120. However, a configuration is also possible in which the driver agent 309 is already installed locally on the client apparatus 120 by the user.

With this driver agent 309, a printer driver is installed from the management apparatus 110 to the client apparatus 120, and settings are made so as to enable printing using the printer 133 of the image processing apparatus 130.

The image processing apparatus 130 is provided with a management information database called a "management information base (MIB) 310". The MIB 310 stores open information for notifying external apparatuses of the status of the printer 133. Access to the MIB 310 is made through SNMP that is a protocol for monitoring/controlling communication devices.

An own management information DB 311 stores own open information that is not stored on the MIB 310. Access to the own management information DB 311 is made through the own protocol for monitoring communication devices. In the management apparatus 110, when the management utility 302 obtains the status of the image processing apparatus 130, either one or both of the communication protocols are used depending on the information obtained.

The image processing apparatus 130 includes a log manager 313 that is a program incorporated in and executed by a web server function 312. The log manager 313 records to a management log 314 if there is a change in the status of the image processing apparatus 130. The management log 314 is written in HTML format. The management log 314 can be viewed from the web browser 307 executed by the client apparatus 120 via the network 100, due to the web server function 312.

Figure 5:
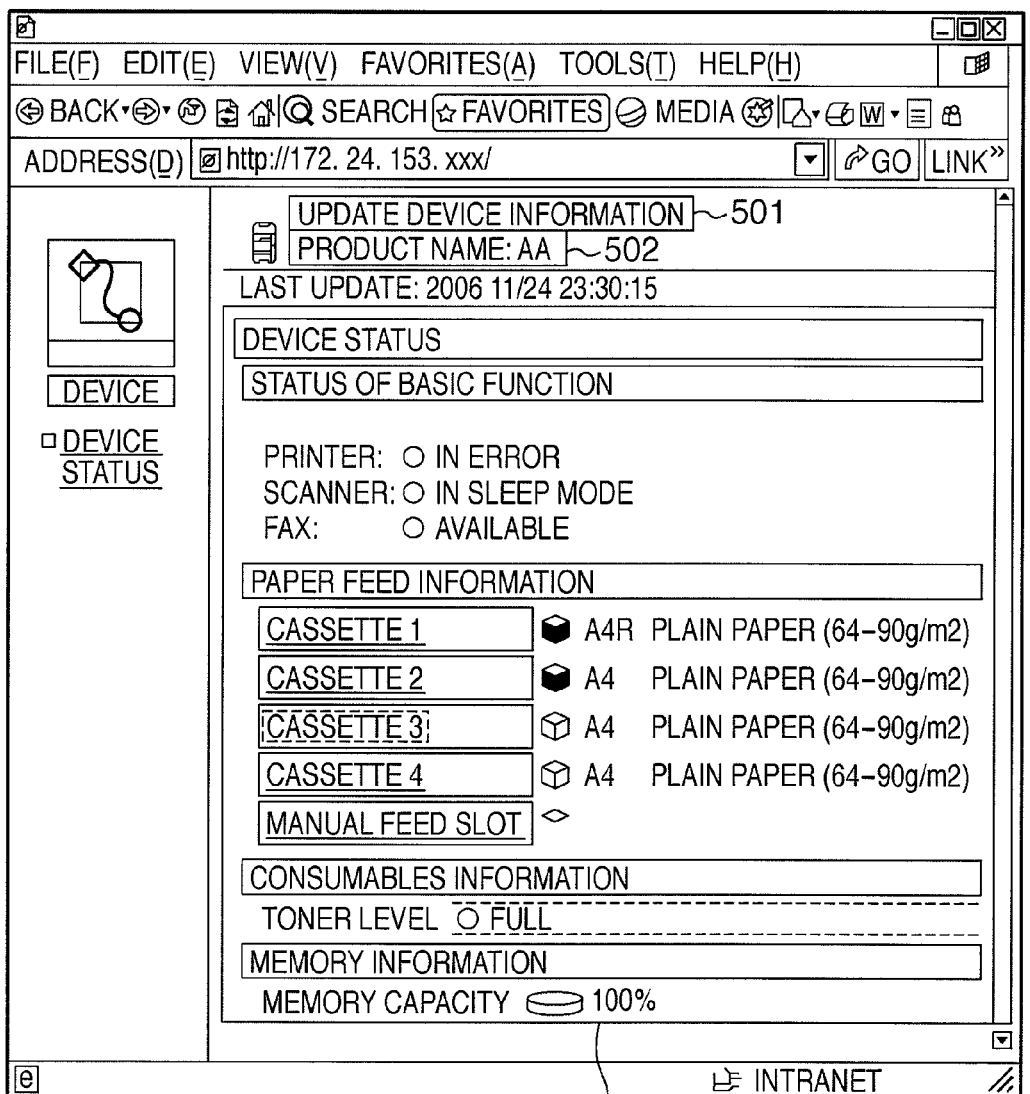
FIG. 5 is a diagram illustrating an example of a screen in which a management log 314 of the image processing apparatus 130 is displayed.

FIG. 5 is a diagram illustrating an example of a screen in which the management log 314 of the image processing apparatus 130 is displayed. In this example, an HTML page of management log 314 generated by the image processing apparatus 130 is displayed by the web browser 307 of the client apparatus 120. Specifically, device name 501, product name 502 and device status information 503 are displayed. Referring to the device status information 503, the fact that cassettes 3 and 4 are out of paper is indicated by icons.

When the management log 314 is updated, the log manager 313 generates, in an RSS format, management log update information 315 that includes the summary and link information of the update information of management log 314. The management log update information 315 can be viewed from the RSS reader 308 on the client apparatus 120 via the network 100, due to the web server function 312.

FIG. 6 is a diagram illustrating an example of a screen in which the management log update information 315 of the image processing apparatus 130 is displayed. Reference numeral 601 defines the RSS version. In FIG. 6, it is written that the RSS version is 2.0, but it may be a different version as long as the RSS reader 308 of the client apparatus 120 supports the version. Reference numeral 602 indicates the summary information of the management log 314 stored in the image processing apparatus 130, and includes an item title, an URL, and a description.

The present embodiment is described in the context of only one image processing apparatus connected to the network 100, but two or more image processing apparatuses may be connected to the network 100. The management apparatus 110 is capable of managing a plurality of image processing apparatuses.

<Functions of Management Apparatus 110>

Next, functions of the management apparatus 110 will be described in further detail. Here, as exemplary functions, a printer status monitoring function, a settings information obtaining function, a settings delivering function and a printer driver distributing function will be described. First, monitoring of the status of the image processing apparatus 130 will be described with reference to FIGS. 7 and 8.

Figure 7:
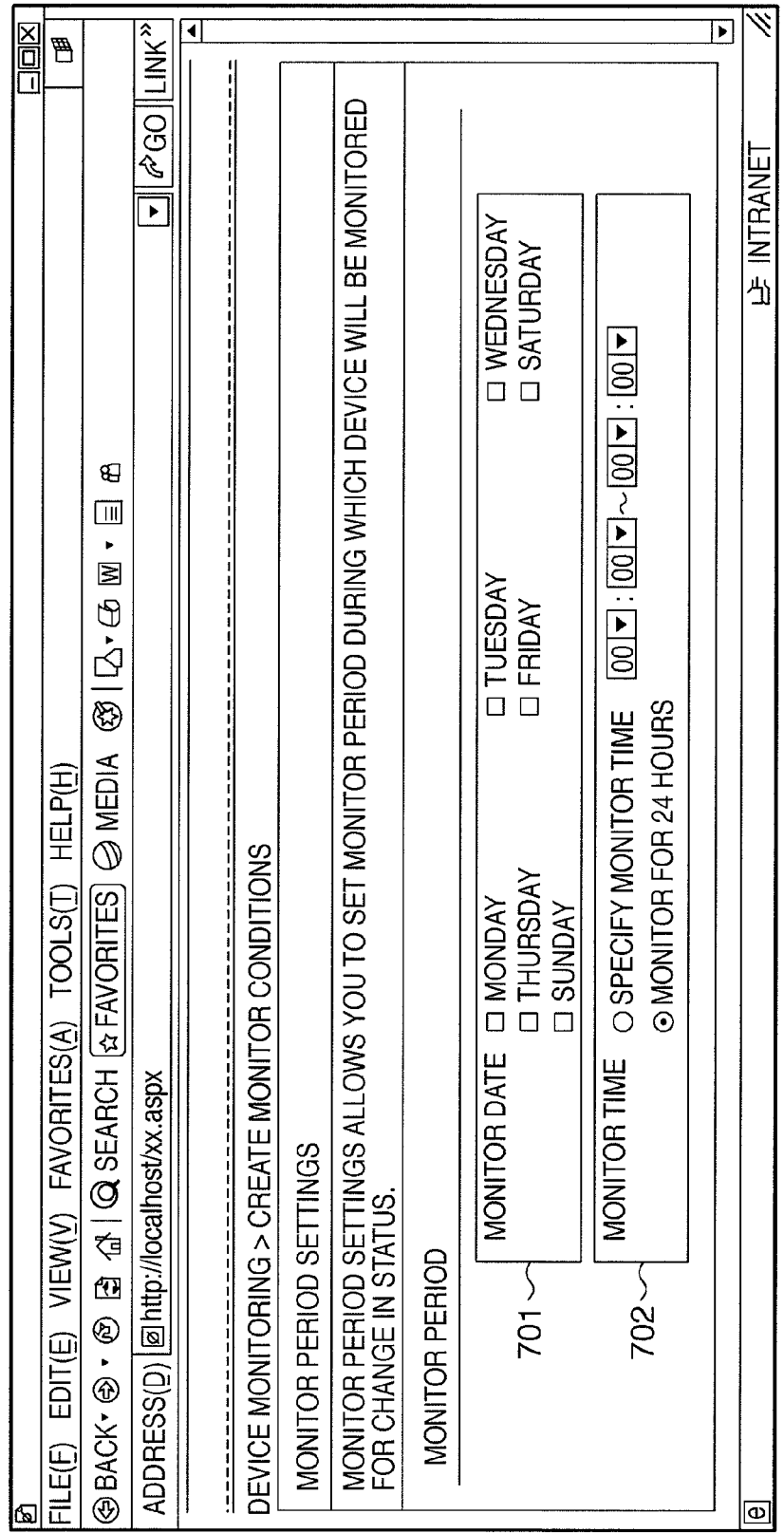
FIG. 7 is a diagram illustrating an example of a screen in which a monitor period during which the management apparatus 110 monitors the image processing apparatus 130 is set.

FIG. 7 is a diagram illustrating an example of a screen in which a monitor period during which the management apparatus 110 monitors the image processing apparatus 130 is set. This screen shows a screen for configuring settings for monitoring the image processing apparatus 130, which is displayed through connection of the web browser 307 running on the client apparatus 120 to the management apparatus 110. Reference numeral 701 shown in FIG. 7 indicates setting parameters for setting monitor dates, and the user can specify which day(s) of the week to monitor. In this example, seven days of the week are used as parameters, but it is also possible to employ a configuration in which the user can specify which day(s) of the month to monitor.

Reference numeral 702 indicates setting parameters for setting monitor time. The user can set when to perform monitoring on the date(s) set in the monitor date 701. This example is configured such that the user can enter the start time and end time of monitoring, or make a setting to perform 24 hour monitoring.

The setting parameters of monitor period entered by the user are stored on the DB 306 of the management apparatus 110. The content of the DB 306 is periodically checked by the management apparatus 110, and the management apparatus 110 monitors the image processing apparatus 130 in accordance with the settings registered by the user.

The management apparatus 110 communicates with the image processing apparatus 130 using SNMP or the own protocol to obtain the status of the image processing apparatus 130. As used herein, the status of the image processing apparatus 130 refers to status information indicative of the status of the apparatus such as standby state, printing state or error state, or the status of consumables such as paper and toner. Then, the management apparatus 110 records the status of the image processing apparatus 130 that the management apparatus 110 is managing on the management log 303 in HTML format.

In the case where there is a plurality of image processing apparatuses, it is also possible to employ a configuration in which the monitor period is set individually for each image processing apparatus in the monitor period setting screen. In this case, the management apparatus 110 can record the status of each image processing apparatus into the management log 303 in HTML format.

FIG. 8 is a diagram illustrating an example of a screen in which detailed information of the image processing apparatus 130 managed by the management apparatus 110 is shown. This screen in which detailed information of the status of the image processing apparatus 130 is shown is displayed through connection of the web browser 307 running on the client apparatus 120 to the management apparatus 110. Reference numeral 801 shown in FIG. 8 indicates device information, in which device name, product name, updated date and time and so on are displayed. Reference numeral 802 indicates detailed information of device status, in which detailed information of the status, that is, the monitored result of the image processing apparatus 130 is displayed.

When there is a plurality of image processing apparatuses, detailed information of the status of each image processing apparatus is displayed on this screen.

Next, another function of the management apparatus 110, namely, a function for obtaining printer settings information and delivering settings will be described with reference to FIG. 9. The items managed by the MIB 310 or the own management information DB 311 of the image processing apparatus 130 can be obtained and set from the management apparatus 110.

FIG. 9 is a diagram illustrating an example of a screen in which settings for the image processing apparatus 130 managed by the management apparatus 110 are made. This screen shows setting items of the image processing apparatus 130, which is displayed through connection of the web browser 307 running on the client apparatus 120 to the management apparatus 110. Reference numeral 901 shown in FIG. 9 indicates device information items, in which information regarding the image processing apparatus 130 can be entered. In this example, items such as device name, installed location, administrator name, administrator's comment, the name of customer service representative, customer service representative contact information, and representative's comment can be entered. Only a few of the setting items can be set by selecting each item check box.

Reference numeral 902 indicates the setting items of the network, in which settings regarding the network of the image processing apparatus 130 can be made. In this example, IP address, subnet mask, gateway address, DNS server address, DNS host name, DNS domain name, SNTP server, etc. can be set. The items entered here are delivered to the image processing apparatus 130 with SNMP or the own protocol upon depressing a register button 903, and then set.

Next, printer driver distribution, which is one of the functions of the management apparatus 110, will be described. The management apparatus 110 is capable of distributing a printer driver to the client apparatus 120 connected via the network 100. This printer driver distribution will be described later in detail.

The foregoing has described the functions of the management apparatus 110, namely, the printer status monitoring function, the settings information obtaining function, the settings delivering function and the printer driver distributing function. However, the management apparatus 110 can also provide, in addition to the above, a page displaying a management log, a page for delivering application programs and resource files to the image processing apparatus 130, etc.

<Operation of Management Apparatus 110 (when Monitoring Printer)>

Next, the operations of the management apparatus 110, namely, an operation performed when monitoring a printer and an operation performed when distributing a printer driver will be described. First, an operation for monitoring the status of the image processing apparatus 130 and detecting a problem performed by the management apparatus 110 will be described with reference to FIG. 10.

Figure 10:
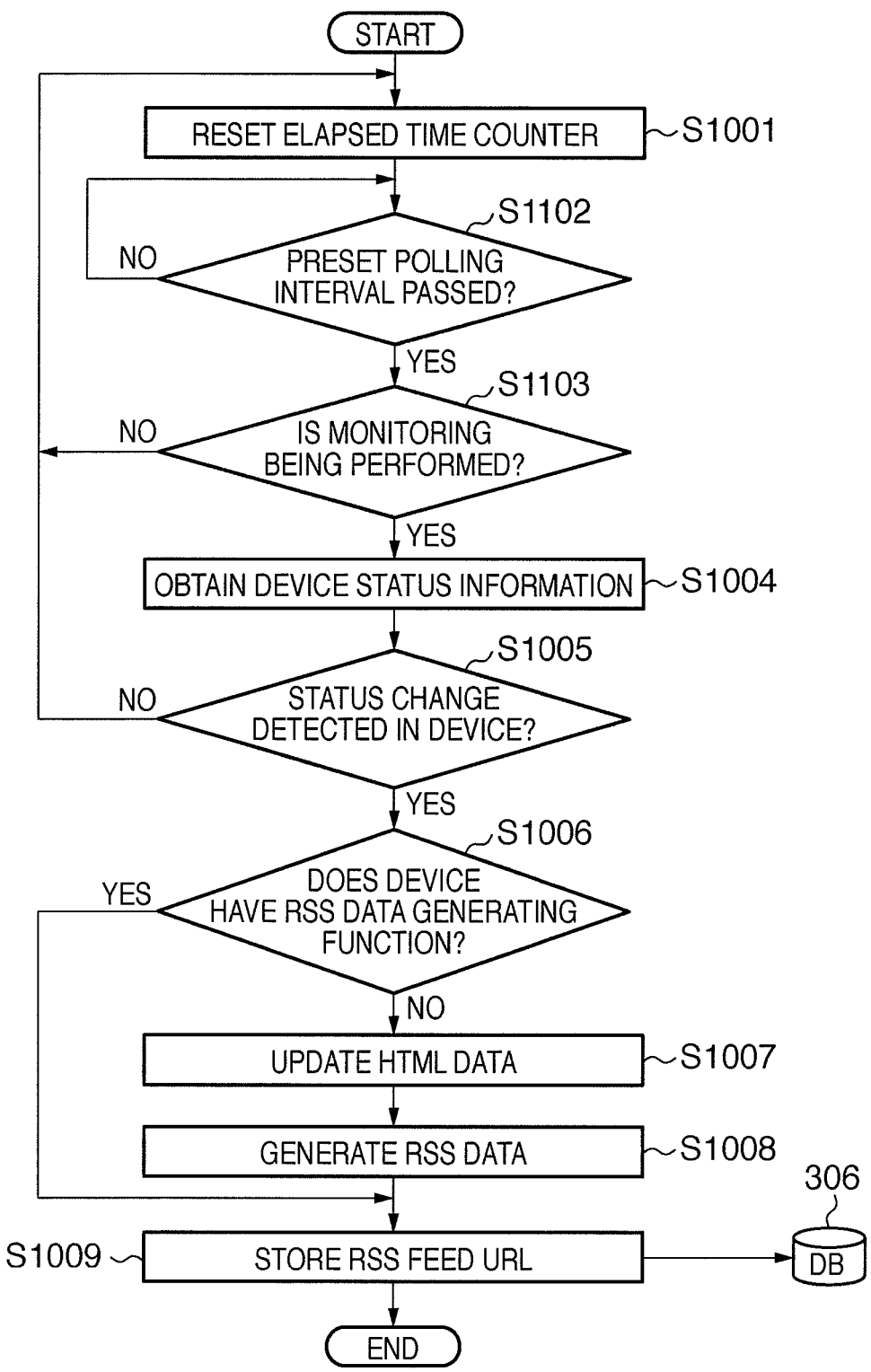
FIG. 10 is a flowchart illustrating an operation for monitoring the status of the image processing apparatus 130 and detecting a problem performed by the management apparatus 110.

FIG. 10 is a flowchart illustrating an operation for monitoring the status of the image processing apparatus 130 and detecting a problem performed by the management apparatus 110. This process is executed by the management utility 302 after the user has selected a target device to be monitored (the image processing apparatus 130) and made settings in the monitoring setting screen shown in FIG. 7.

First, in step S1001, the management utility 302 initializes (resets) an elapsed time counter. Then, in step S1002, it waits for a period of time corresponding to a preset polling interval to pass. After the time corresponding to the polling interval has passed, the procedure advances to step S1003, where it is checked whether or not monitoring is being performed. If it is determined that monitoring is not being performed, the procedure returns to step S1001, where it again waits until the polling interval passes.

If, on the other hand, it is determined in step S1003 that monitoring is being performed, the procedure advances to step S1004, where device status information is obtained. The device status information refers to status information indicative of the status of the apparatus such as standby state, printing state or error state, or the status of consumables such as paper and toner. The device status information is obtained using SNMP or the own protocol.

Next, in step S1005, it is detected whether or not a status change has occurred in the target device to be monitored based on the device status information obtained in step S1004. As used herein, the status change refers to a situation in which there is a change in device status information from the previously obtained device status. Of course, a situation in which the device recovers from an error state may or may not be included in the status change.

If it is determined in step S1005 that there is no status change in the target device to be monitored, the procedure returns to step S1001. However, if there is a status change, the procedure advances to step S1006, where it is determined whether or not the device has an RSS data generating function.

The RSS data generating function refers to a function for updating the management log 314 and the management log update information 315 according to the status change of the device itself that possesses the management log update information 315. Information regarding whether or not the device has the RSS data generating function is obtained using SNMP or the own protocol. Even if the device has the RSS data generating function, when the web server function 312 is turned off, or generation of management log 314 by the log manager 313 is turned off, it is determined that the device does not have the RSS data generating function.

If it is determined in step S1006 that the device has the RSS data generating function, the device generates RSS data, and the procedure advances to step S1009.

If, on the other hand, it is determined in step S1006 that the device does not have the RSS data generating function, the procedure advances to step S1007, where the HTML data of the management log 303 is updated based on the device status information obtained in step S1004. Then, in step S1008, the RSS data of management log update information 304 is updated based on the management log 303 updated in step S1007.

In the present embodiment, the RSS data source of management log update information 304 differs depending on whether or not the device has the RSS data generating function. However, when it is necessary to notify the same status information, the management apparatus 110 may generate RSS data regardless of whether or not the device has the RSS data generating function.

In step S1009, the RSS feed URL indicative of the RSS data is stored on the DB 306 of the management apparatus 110.

FIG. 11 is a diagram illustrating an example of RSS data of management log update information 304 generated by the management apparatus 110. Reference numeral 1101 shown in FIG. 11 defines the RSS version. Here, it is written that the RSS version is 2.0, but it may be a different version as long as the RSS reader 308 of the client apparatus 120 supports the version.

Reference numeral 1102 indicates summary information of the HTML data of management log 303 generated or updated within the management apparatus 110, in which item titles, URLs and descriptions are included. In the present embodiment, RSS data of management log update information 304 is generated for each type of status information so as to be able to select error items to be notified such as "notify me only when a paper jam occurs". In the case where a setting is made to notify all of the error items all the time, RSS data of management log update information 304 may be collectively stored in a single file without storing RSS data for each type of status information.

When the device has the RSS data generating function, HTML data of management log 314 and RSS data of management log update information 315 are generated within the device, and they are published by the web server function 312. Accordingly, the content of device status notification depends on the implementation of the log manager 313 that is the source of management log update information 315.

If, on the other hand, the device does not have the RSS data generating function, the management apparatus 110 generates HTML data of management log 303 and RSS data of management log update information 304. Accordingly, the content of device status notification depends on the implementation of the management apparatus 110. In the case where a plurality of types of devices, including devices of other manufactures, are used, the content of notification may differ depending on the RSS data generated by these devices. Accordingly, when it is necessary to notify the same device status notification regardless of whether or not the device has the RSS data generating function, the management apparatus 110 may generate all RSS data without determining whether or not the device has the RSS data generating function.

<Operation of Management Apparatus (when Distributing Printer Driver)>

Next, a process for distributing a printer driver from the management apparatus 110 to the client apparatus 120 will be described with reference to FIG. 12. This process is executed by the management utility 302 by receiving a printer driver distribution request at any timing after the user has performed the device status monitoring setting. This is performed by a management program of the management apparatus 110 and the driver agent 309 of the client apparatus 120.

Before this, it is necessary for the user to associate a printer managed by the management apparatus 110 with a printer driver used by the printer for printing by the user. The user can make a printer driver distribution request by selecting the printer or the association between the printer and the printer driver.

It is assumed that an RSS reader (in which RSS feed registration is published with API) built into a web browser, or a dedicated RSS reader is already installed on the client apparatus 120. The web browser can be any browser as long as it is possible to browse websites (web pages).

Figure 12:
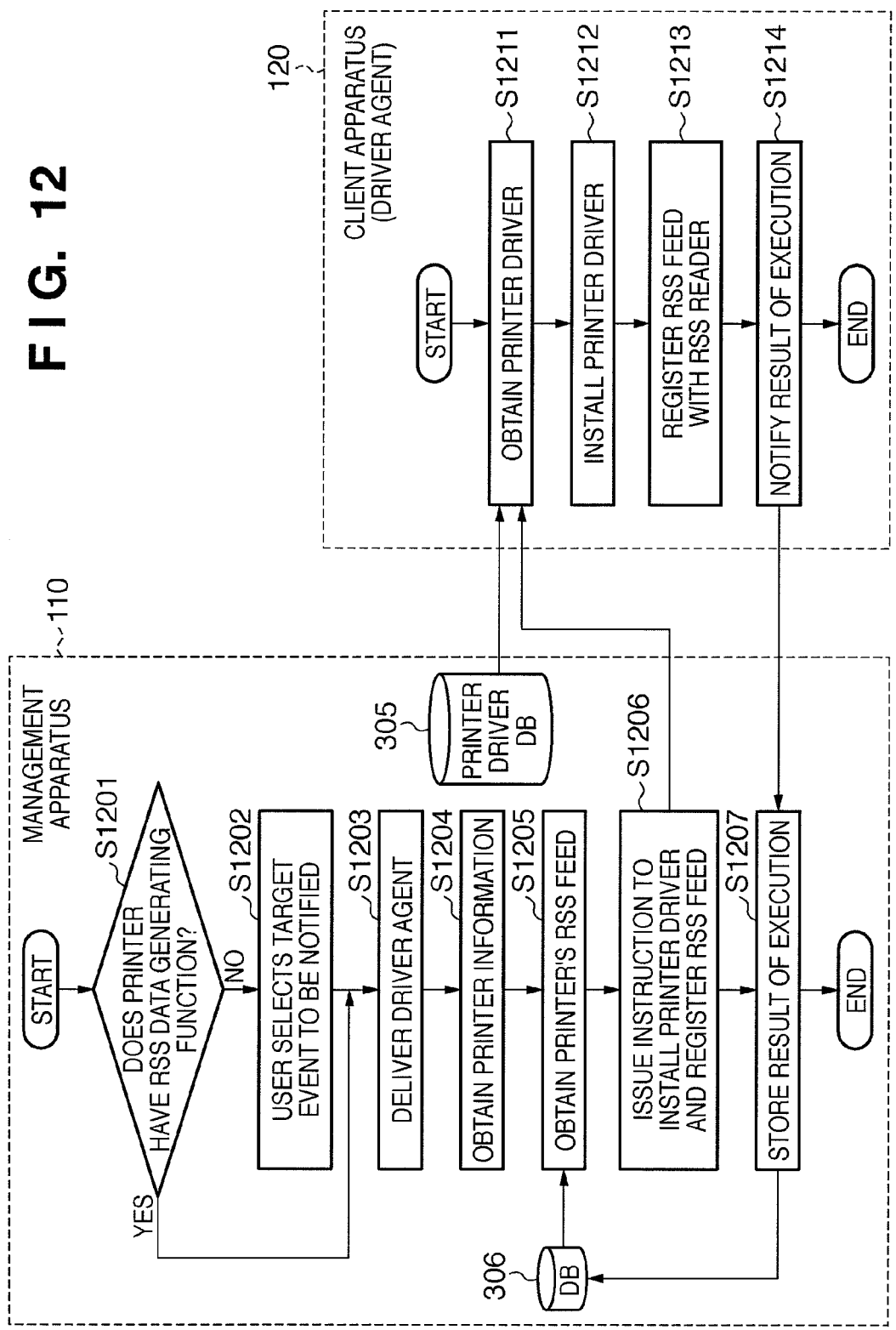
FIG. 12 is a flowchart illustrating a printer driver distribution process according to an embodiment of the present invention.

FIG. 12 is a flowchart illustrating a printer driver distribution process according to the present embodiment. First, in step S1201, the management utility 302 of the management apparatus 110 determines whether or not the network printer that distributes the printer driver has the RSS data generating function. If the printer has the RSS data generating function, the procedure advances to step S1203. If, on the other hand, the printer does not have the RSS data generating function, the procedure advances to step S1202, where a target event to be notified is selected by the user. This selection is to select target RSS data to be notified from among RSS data of management log update information 304 generated by the management apparatus 110 for each type of status information.

FIG. 13 is a diagram illustrating an example of a screen for selecting target events to be notified according to the present embodiment. Reference numeral 1301 shown in FIG. 13 indicates possible target event items to be notified, and target events to be notified are selected from among the possible target event items to be notified. Reference numeral 1302 indicates a register button, which is depressed when registering the target events to be notified selected by the user.

In order to allow the items displayed in 1301 to serve as target events to be notified, it is necessary that the management apparatus 110 generates RSS data separately for each status type such as "out-of-paper" and "toner/ink error" in the device status monitoring process.

Next, in step S1203, the management apparatus 110 delivers the driver agent 309 to the client apparatus 120. The driver agent 309 is an application program used when the management apparatus 110 installs a printer driver on the client apparatus 120. The management apparatus 110 also requests the user to enter the user ID and password of a user who is responsible for administering the client apparatus 120 when installing the driver agent 309, and then installs the driver agent 309 on the client apparatus 120 using the user ID and password entered by the user. The installed driver agent 309 is executed in the background by a service of the OS of the client apparatus 120.

Subsequently, in step S1204, the management apparatus 110 obtains the printer information associated with the printer driver that needs to be delivered. The information obtained here is information that is necessary to set so as to allow the printer driver that is to be installed to perform printing. For example, in the case of a standard TCP/IP port connection, it is necessary to designate an IP address and Raw/LPR protocols. Then, in step S1205, the management apparatus 110 obtains an RSS feed stored on the DB 306 of the management apparatus 110. When the printer to which the printer driver to be distributed belongs is a printer having the RSS data generating function, the management apparatus 110 obtains RSS feeds corresponding to the notification events selected in step S1202.

Next, in step S1206, the management apparatus 110 transmits, to the driver agent 309, an instruction to install the printer driver and register the RSS feeds, using the obtained printer information and RSS feed information.

Upon receiving the request to install the printer driver and register the RSS feed from the management apparatus 110, the driver agent 309 of the client apparatus 120 obtains the printer driver from the printer driver DB 305 in step S1211, and installs the printer driver on the client apparatus 120 in step S1212.

When the printer driver installation is finished, use of the network printer from the client apparatus 120 is enabled. After that, in step S1213, the RSS feeds are registered with the RSS reader 308 of the client apparatus 120. The registration of the RSS feeds with the RSS reader 308 is performed by using an API for registering feeds published by the RSS reader, such as an RSS platform built in a browser. Then, in step S1214, the result of execution is notified to the management apparatus 110.

Upon receiving the result of execution of the printer driver installation and RSS feed registration from the driver agent 309, the management apparatus 110 stores the result of execution on the DB 306 in step S1207, and then makes settings for receiving printer status notifications.

Here, the RSS data source used differs depending on whether or not the printer has the RSS data generating function, but a configuration is of course possible in which the management apparatus 110 generates all RSS data regardless of whether or not the printer has the RSS data generating function.

Through the above process, the RSS feeds for notifying printer status information can be registered with the RSS reader 308 of the client apparatus 120 to which the printer driver has been distributed. Thus, the user can readily obtain status information of the printer set up in the client apparatus 120 using the RSS reader 308.

[Other Embodiments]

Another embodiment of the present invention will be described in detail next with reference to the accompanying drawings. The above embodiment has been described in context of the RSS reader 308 being an RSS reader built in a browser and installed on the client apparatus 120. In the present embodiment, a process performed when the RSS reader 308 is not installed on the client apparatus 120 will be described. Here, an RSS reader function is provided in the driver agent 309 used when installing a printer driver, and delivers an RSS reader to the client apparatus 120.

The RSS reader function provided in the driver agent 309 can take any form as long as it can be provided in the driver agent 309, such as a ticker type. In addition, the driver agent 309 and the RSS reader function are not necessarily a single application program, and may be two different application programs.

Furthermore, in the present embodiment, a description of the hardware configuration and software configuration that are the same as those of the above embodiment is omitted.

Figure 14:
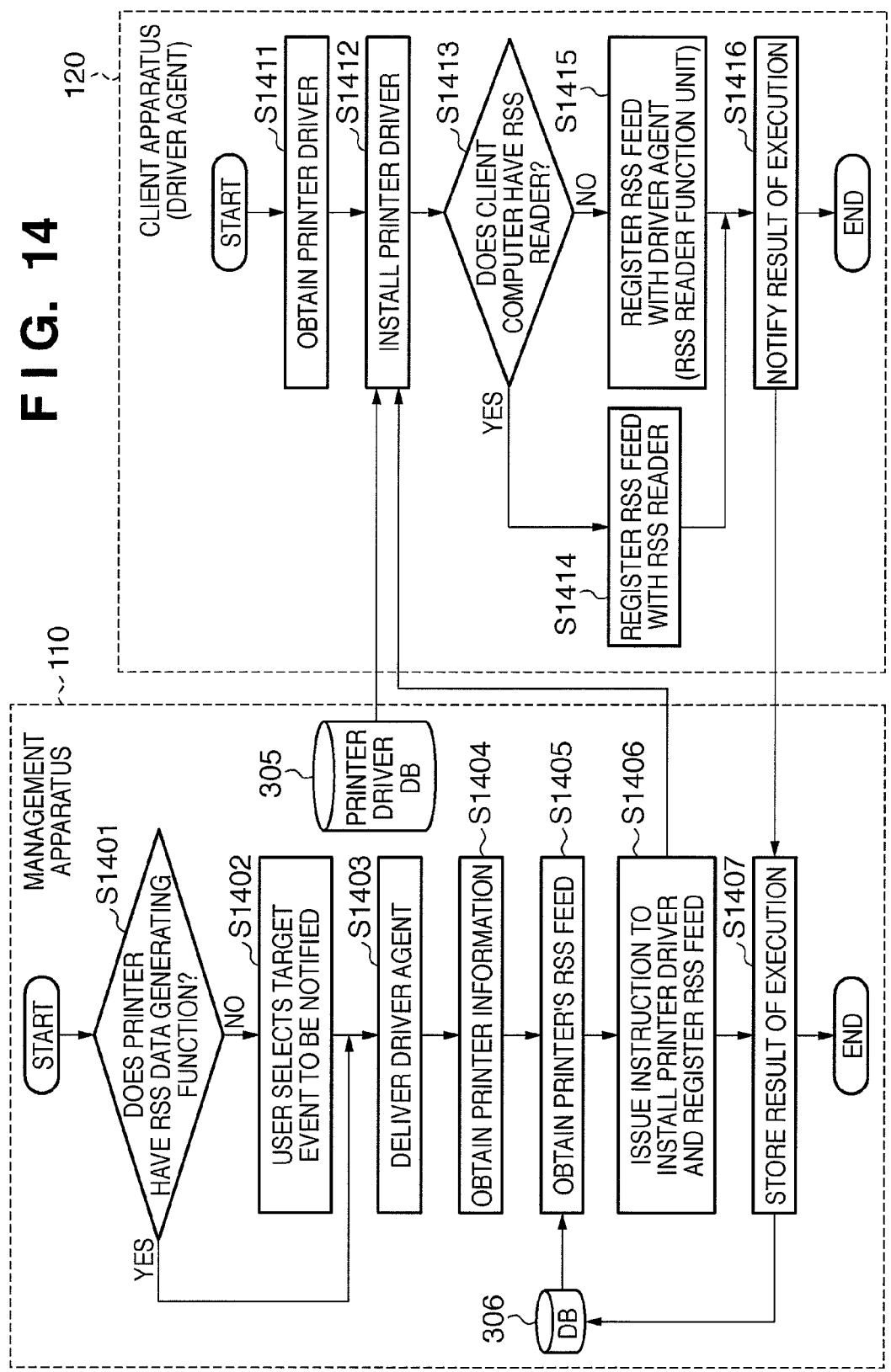
FIG. 14 is a flowchart illustrating a printer driver distribution process according to another embodiment of the present invention.

FIG. 14 is a flowchart illustrating a printer driver distribution process according to the present embodiment. Here, a description of steps S1401 to S1407, S1411, S1412 and S1416 shown in FIG. 14 is omitted here because these steps are the same as steps S1201 to S1207, S1211, S1212 and S1214 shown in FIG. 12.

When the installation of a printer driver on the client apparatus 120 is finished, in step S1413, the driver agent 309 determines whether or not the RSS reader 308 is installed on the client apparatus 120. For example, in the case of a web browser, the presence/absence of the RSS reader can be determined by obtaining version information from a registry. Other methods for determining whether or not the RSS reader is installed include a method of checking specified folders on the HD, and so on, and different methods are used depending on the RSS reader used.

If it is determined in step S1413 that the RSS reader 308 is installed on the client apparatus 120, the procedure advances to step S1414, where the RSS feeds are registered with the RSS reader 308 installed on the client apparatus 120. If, on the other hand, it is determined that the RSS reader 308 is not installed on the client apparatus 120, the procedure advances to step S1415.

In step S1415, the RSS feeds are registered with an RSS reader function unit provided in the driver agent 309. The RSS reader used differs depending on whether or not the RSS reader is present in the client apparatus 120. It is of course possible to use the RSS reader function unit of the driver agent 309 regardless of the presence/absence of the RSS reader in the client apparatus 120.

According to the present embodiment, it is possible to register the RSS feeds for notifying printer status information with the RSS reader of the client apparatus 120 to which a printer driver has been distributed.

Furthermore, even if the RSS reader is not installed on the client apparatus 120 in advance, the RSS reader with which RSS feeds for notifying printer status information are registered can be delivered at the same time when a printer driver is installed.

According to the embodiment described above, the management apparatus can register RSS feeds for notifying information supported by the application program delivered to the client apparatus with the RSS reader. Accordingly, it is possible to provide, to the user, an advantage that, when receiving notifications regarding information of the image processing apparatus that has been set up in the client apparatus with RSS technology, it is possible to eliminate a complicated process of registering feeds with the RSS reader.

Note that the present invention may be applied to a system comprising a plurality of devices (for example, a host computer, an interface device, a reader, a printer, and so on), or may be applied to an apparatus comprising a single device (for example, a copy machine, a facsimile device, and so on).

Furthermore, it goes without saying that the object of the present invention can also be achieved by supplying, to a system or apparatus, a recording medium in which the program code for software that realizes the functions of the above embodiment has been stored, and causing a computer (CPU or MPU) of the system or apparatus to read out and execute the program code stored in the recording medium.

In such a case, the program code read out from the recording medium realizes the functionality of the above embodiment, and the present invention is configured of the recording medium in which the program code is stored.

Examples of a recording medium for supplying the program code include a flexible disk, a hard disk, an optical disk, a magneto-optical disk, a CD-ROM, a CD-R, magnetic tape, a non-volatile memory card, a ROM, and so on.

Moreover, it goes without saying that the following case also falls under the scope of the present invention, which is not limited to implementing the functions of the above embodiment by a computer executing the read-out program code. That is, the case where an operating system (OS) or the like running in a computer performs part or all of the actual processing based on instructions in the program code, and the functionality of the above embodiment is realized by that processing, is included in the scope of the present invention.

Furthermore, the case in which the program code read out from the recording medium is written into a memory included in an expansion board inserted into the computer, an expansion unit connected to the computer, or the like, a CPU or the like included in the expansion board or expansion unit then performs all or part of the actual processing based on instructions included in the program code, and the functions of the above embodiment are implemented through that processing, is also included within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-023314, filed on Feb. 1, 2008, and which is hereby incorporated by reference herein in its entirety.

What is claimed is:

1. A notification method of a change in a status of an image processing apparatus to a client apparatus via a network, the notification method comprising:

when a change occurs in the status of the image processing apparatus, generating update information in which the status change is written;

notifying the client apparatus of the status change of the image processing apparatus with a function for delivering the generated update information, based on a device status monitoring setting input by a user;

when receiving a delivery request for a printer driver of the image processing apparatus after a user has performed a device status monitoring setting, a management apparatus determines whether the image processing apparatus has a RSS data generating function, if the image processing apparatus is determined to not contain the RSS data generating function, the user selects a target event to be notified to the client apparatus;

after the target event is selected, delivering from a management apparatus that manages the image processing apparatus a driver installation application that is utilized for installing a printer driver of the image processing apparatus on the client apparatus;

acquiring printer information associated with the printer driver of the image processing apparatus required for installing the printer driver;

ordering, in a single instruction, both installation of the printer driver using the printer information and registration of an RSS feed for receiving the generated update information from the management apparatus after the driver installation application is delivered receiving the status of the image processing apparatus after a result of execution of the RSS feed registration is received from the client apparatus;

wherein the printer driver is installed on the client apparatus using the driver installation application.

2. A management apparatus that manages an image processing apparatus via a network and notifies a client apparatus of a status change of the image processing apparatus, the management apparatus comprising:

a generating unit configured to, when a change occurs in the status of the image processing apparatus, generate update information in which the status change is written;

a notification unit configured to notify the client apparatus of the status change of the image processing apparatus with a function for delivering the generated update information, based on a device status monitoring setting input by a user;

when receiving a delivery request for a printer driver of the image processing apparatus after a the user has performed a device status monitoring setting, a management utility determines whether the image processing apparatus has a RSS data generating function, if the image processing apparatus is determined to not contain the RSS data generating function, the user selects a target event to be notified to the client apparatus;

after the target event is selected, a delivering unit configured to, deliver a driver installation application that is utilized for installing a printer driver of the image processing apparatus on the client apparatus;

an acquiring unit configured to acquire printer information associated with the printer driver of the image processing apparatus required for installing the printer driver;

an ordering unit configured to order, in a single instruction, both installation of the printer driver using the printer information and registration of an RSS feed for receiving the generated update information after the driver installation application is delivered;

a receiving unit configured to receive the status of the image processing apparatus after a result of execution of the RSS feed registration is received from the client apparatus;

wherein the printer driver is installed on the client apparatus using the driver installation application.

3. A non-transitory computer-readable recording medium in which a program for causing a computer to execute the notification method according to claim 1 is recorded.

* * * * *